United States Patent
Pujar et al.

(10) Patent No.: US 12,421,637 B2
(45) Date of Patent: Sep. 23, 2025

(54) SYSTEMS AND METHODS FOR SELECTIVE NEEDLING OF FIBROUS PREFORMS FOR SHAPE-FORMING

(71) Applicant: Rohr, Inc., Chula Vista, CA (US)

(72) Inventors: Vijay V. Pujar, San Diego, CA (US); Katherine E. Waugh, San Diego, CA (US); Christopher C. Koroly, Spring Valley, CA (US)

(73) Assignee: Rohr, Inc., Chula Vista, CA (US)

( * ) Notice: Subject to any disclaimer, the term of this patent is extended or adjusted under 35 U.S.C. 154(b) by 303 days.

(21) Appl. No.: 18/174,360

(22) Filed: Feb. 24, 2023

(65) Prior Publication Data
US 2024/0158970 A1 May 16, 2024

Related U.S. Application Data

(60) Provisional application No. 63/425,636, filed on Nov. 15, 2022.

(51) Int. Cl.
*D04H 18/02* (2012.01)
*D04H 1/46* (2012.01)

(52) U.S. Cl.
CPC ............ *D04H 18/02* (2013.01); *D04H 1/46* (2013.01)

(58) Field of Classification Search
CPC ............ D04H 18/02; D04H 1/46; D04H 5/02; D04H 3/105; D04H 3/102; D04H 1/48; D04H 13/003; D04H 13/005; B32B 1/00; B32B 3/02; B32B 5/022; B32B 5/06; B32B 5/14; B32B 5/142; B32B 5/145; B32B 37/00; B29B 11/16; B29B 11/06; B29B 11/12

(Continued)

(56) References Cited

U.S. PATENT DOCUMENTS 3,956,560 A * 5/1976 Smith, II ............... D04H 18/02
428/218
4,522,876 A * 6/1985 Hiers ....................... B32B 5/06
55/DIG. 36

(Continued)

FOREIGN PATENT DOCUMENTS

| CN | 110344175 | 3/2022 |
| FR | 3101276 | 4/2021 |

OTHER PUBLICATIONS

European Patent Office, European Search Report dated Apr. 26, 2024 in Application No. 23209477.1.

*Primary Examiner* — Amy Vanatta
(74) *Attorney, Agent, or Firm* — SNELL & WILMER L.L.P.

(57) ABSTRACT

A method for selective needling on a fibrous preform includes performing a through thickness reinforcement process on the fibrous preform and varying a needle density, a needle angle, and/or a needle penetrating depth during the through thickness reinforcement process such that a first needle density, a first needle angle, and/or a first needle penetrating depth of a first zone of the fibrous preform is greater than a second needle density, a second needle angle, and/or a second needle penetrating depth of a second zone of the fibrous preform. The method can further include identifying expected interlaminar stress throughout the fibrous preform and varying the needle density, needle angle, and/or needle penetrating depth in accordance with a magnitude of the expected interlaminar stress.

20 Claims, 12 Drawing Sheets

(58) Field of Classification Search
USPC .................................. 28/107, 115, 109, 112
See application file for complete search history.

(56) References Cited

U.S. PATENT DOCUMENTS

| | | | | |
|---|---|---|---|---|
| 4,948,649 | A * | 8/1990 | Hiers | B32B 5/26 |
| | | | | 28/107 |
| 5,388,320 | A * | 2/1995 | Smith | D04H 3/10 |
| | | | | 28/107 |
| 5,908,792 | A * | 6/1999 | Sheehan | F16D 69/023 |
| | | | | 442/388 |
| 6,248,417 | B1 | 6/2001 | Ponsolle et al. | |
| 8,038,953 | B2 | 10/2011 | Okabe | |
| 10,414,142 | B2 | 9/2019 | Chamberlain et al. | |
| 2001/0005927 | A1* | 7/2001 | Ruiz | D04H 13/00 |
| | | | | 28/107 |
| 2012/0124952 | A1* | 5/2012 | Uno | D04H 18/00 |
| | | | | 428/222 |
| 2017/0239911 | A1* | 8/2017 | La Forest | C04B 35/52 |
| 2018/0103724 | A1* | 4/2018 | Ho | D05B 55/00 |

\* cited by examiner

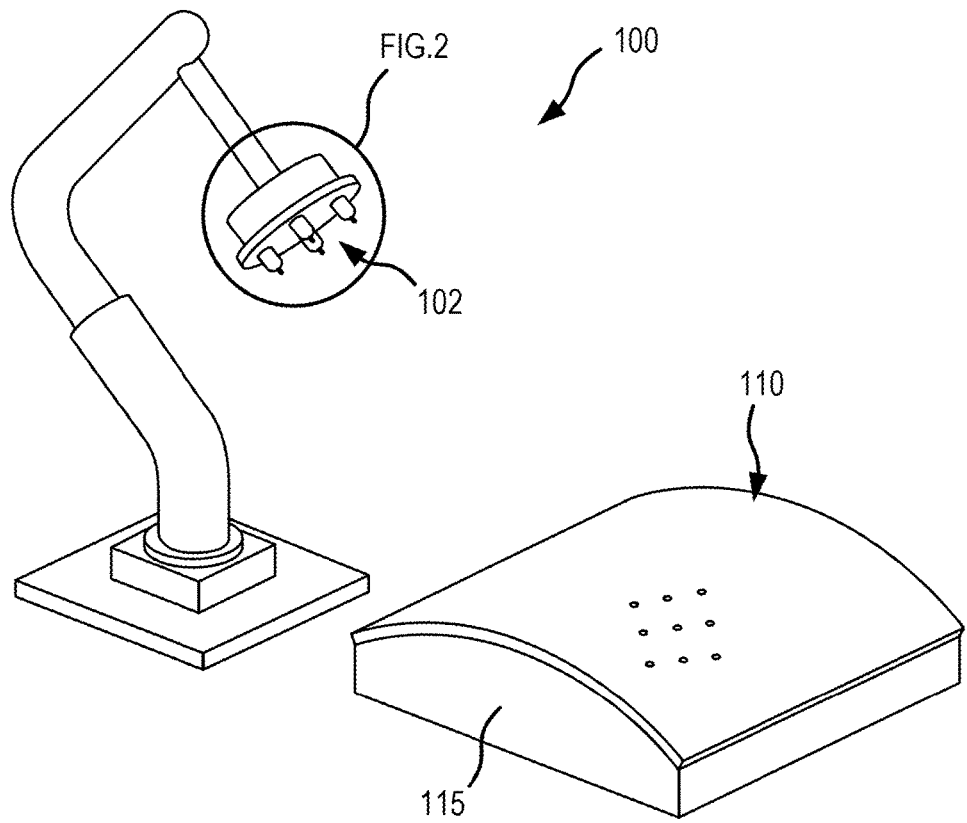
FIG. 8
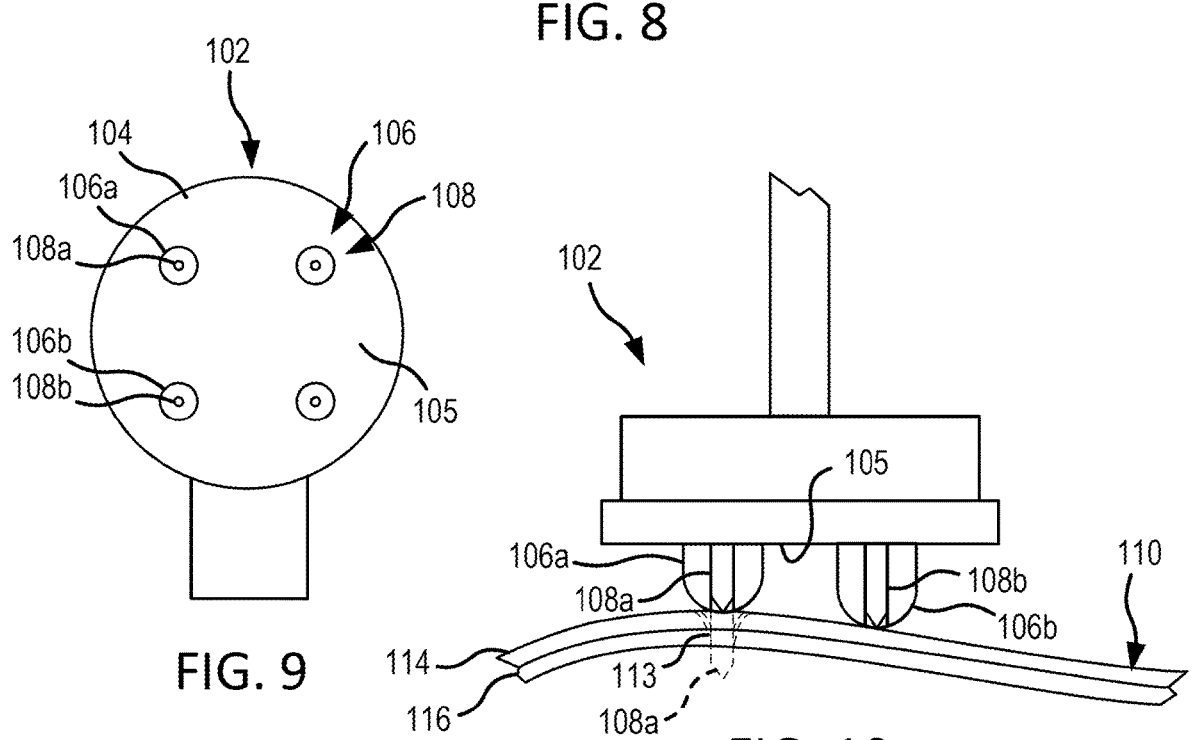
FIG. 9
FIG. 10

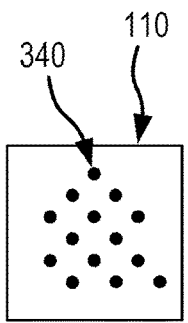 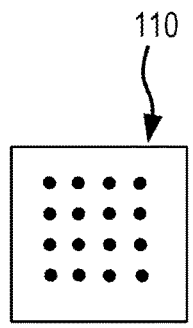 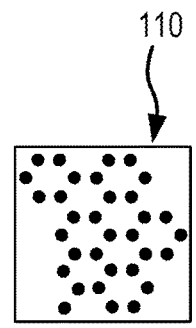 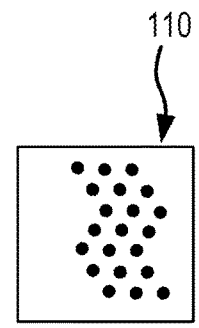
FIG. 12A   FIG. 12B   FIG. 12C   FIG. 12D
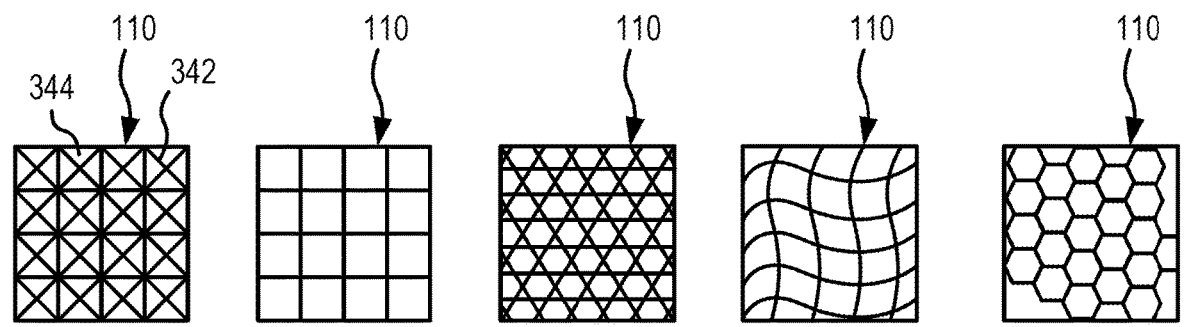
FIG. 13A   FIG. 13B   FIG. 13C   FIG. 13D   FIG. 13E

SYSTEMS AND METHODS FOR SELECTIVE NEEDLING OF FIBROUS PREFORMS FOR SHAPE-FORMING

CROSS REFERENCE TO RELATED APPLICATIONS

This application claims priority to, and the benefit of, U.S. Provisional Patent Application Ser. No. 63/425,636, entitled "SYSTEMS AND METHODS FOR SELECTIVE NEEDLING OF FIBROUS PREFORMS FOR SHAPE-FORMING," filed on Nov. 15, 2022. The '636 Applications is hereby incorporated by reference in its entirety for all purposes.

FIELD

The present disclosure relates generally to needled fibrous preforms, more particularly, to needling systems and methods of fibrous preforms for complex contour, fiber-reinforced composite parts.

BACKGROUND

Fiber-reinforced composites, such as carbon/carbon (C/C) composites are often produced utilizing fiber-based preforms (e.g., oxidized polyacrylonitrile (PAN) fibers, carbon fibers, silicon carbide fibers, among others) followed by heat-treatment and densification (e.g., chemical vapor infiltration (CVI) and or polymer impregnation and pyrolysis (PIP), among others). It is desirable for composite structures to be designed to withstand in-plane and interlaminar stresses. These stresses can vary across the structure.

SUMMARY

A method for selective needling on a fibrous preform is disclosed, comprising identifying a first zone on the fibrous preform, identifying a second zone on the fibrous preform, and performing a through thickness reinforcement process on the fibrous preform. In various embodiments, the method further includes varying a needle density during the through thickness reinforcement process such that a first needle density of the first zone is greater than a second needle density of the second zone. In various embodiments, the method further comprises varying a needle angle during the through thickness reinforcement process such that a first needle angle of at least one of the first zone or the second zone is greater than a second needle angle of the other of the first zone or the second zone. In various embodiments, the method further comprises varying a needle penetrating depth during the through thickness reinforcement process such that a first needle penetrating depth of at least one of the first zone or the second zone is greater than a second needle penetrating depth of the other of the first zone or the second zone.

In various embodiments, the first zone is identified as comprising a first interlaminar stress and the second zone is identified as comprising a second interlaminar stress, wherein the first interlaminar stress is greater than the second interlaminar stress.

In various embodiments, the through thickness reinforcement process comprises penetrating the fibrous preform with a first needle, penetrating the fibrous preform with a second needle, moving at least a portion of a first fiber from a first layer of the fibrous preform into a second layer of the fibrous preform in response to the first needle penetrating the fibrous preform, and moving at least a portion of a second fiber from the first layer of the fibrous preform into the second layer of the fibrous preform in response to the second needle penetrating the fibrous preform.

In various embodiments, the method further comprises shape forming the fibrous preform subsequent to the through thickness reinforcement process. In various embodiments, the method further comprises shape forming the fibrous preform prior to the through thickness reinforcement process.

In various embodiments, the method further comprises performing a heat-treatment process on the fibrous preform subsequent to performing the through thickness reinforcement process. In various embodiments, the heat-treatment process is performed subsequent to shape forming. In various embodiments, a heat treatment may be performed on the fibrous preform prior to performing the through-thickness reinforcement. In various embodiments, the method further comprises performing a compaction (e.g., by compressing the fibrous preform between two surfaces) of the fibrous preform prior to performing the through-thickness reinforcement process. In various embodiments, the method further comprises performing a densification process on the fibrous preform subsequent to performing the through thickness reinforcement process.

In various embodiments, the fibrous preform comprises a plurality of fabric layers. In various embodiments, the fabric layers comprise a plurality of continuous fiber tows, wherein a fiber tow comprises of a plurality of fiber filaments. In various embodiments, the fabric layers are a weave (e.g., a plain weave, a five harness satin weave, an eight harness satin weave, a basket weave, among others), a braid (e.g., a biaxial braid, a triaxial braid, and the like), a unidirectional tape or fabric layer, or one or more unidirectional tape or fabric layers wherein each layer is oriented in a different direction relative to the other layer and stitched together to form a stitched non-crimp fabric. In various embodiments, the fibrous preform may further comprise of a fabric layer with discontinuous fibers (e.g., a non-woven fiber mat or veil comprising of discontinuous fibers, chopped fibers and the like). In various embodiments, the discontinuous fibers may be randomly oriented or preferentially aligned predominantly in one direction.

In various embodiments, within a fabric layer, the through thickness reinforcement process comprises penetrating a first fiber tow, penetrating a second fiber tow, and leaving a third fiber tow between the first fiber tow and the second fiber tow unneedled so as to maintain the third fiber tow as a continuous, i.e., un-needled fiber tow. In various embodiments, the un-needled fiber tow may be oriented within the composite structure along a direction of high in-plane stress.

In various embodiments, the through thickness reinforcement process comprises penetrating a plurality of zones to generate a plurality of needled zones. In various embodiments, the plurality of needled zones comprise at least one of a triangular, a square, a rectangular, a hexagonal, or a curvilinear geometry, among others.

In various embodiments, the fibrous preform may comprise of a mixture of fabric layers, comprising of a first fabric layer comprising of continuous fibers, and a second fabric layer comprising of discontinuous fibers. In various embodiments, the fabric layer comprising of the discontinuous fibers may be positioned toward the top of the fibrous preform such that this layer is the first layer coming into contact with the needles when the preform is needled.

In various embodiments, the continuous fibers may be a different material from the discontinuous fibers (e.g., the fabric layer comprising continuous fiber tows may comprise carbon fiber, while the fabric layer comprising discontinuous fibers may comprise chopped oxidized PAN fiber (OPF).

In various embodiments, the method further comprises penetrating a first area of the fibrous preform with a first needling penetrations pattern, and penetrating a second area of the fibrous preform with a second needling penetration pattern. The first needling penetration pattern can comprise at least one of an array of circular pattern, triangular pattern, a rectangular pattern, a square pattern, a hexagonal pattern, or a curvilinear pattern. The second needling penetration pattern comprises another of the at least one of the circular pattern, triangular pattern, the rectangular pattern, the square pattern, the hexagonal pattern, or the curvilinear pattern (i.e., the first needling penetration pattern is different form the second needling penetration pattern). In various embodiments, the spacing between the needling penetrations in the first needling penetration may be different from that in the second needling penetration.

In various embodiments, at least one of the needling angle, the needling penetration depth, or the needling density is selected to correspond to a magnitude of an interlaminar stress of the fibrous preform.

In various embodiments, the needle may be configured with one or more barbs along the length of the needle, wherein each barb is designed to entrain or capture one or more fibrous filaments within a ply or layer of the fibrous preform. In various embodiments, as the needle penetrates the fibrous preform, at least a portion of the entrained fibrous filaments in the barbs are transported along the direction of the penetrating needle to provide through-thickness reinforcement. In various embodiments, the needle may be alternatively or additionally configured to be a stitching or a tufting needle with an eye to transport fibrous filament along the direction of the penetration.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 8 illustrates a perspective view of an exemplary robotic arm comprising an end effector during a through thickness reinforcement process of a fibrous preform, in accordance with various embodiments;

FIG. 9 illustrates a front view of a face of the end effector of FIG. 1, in accordance with various embodiments;

FIG. 10 illustrates a schematic sectional view of the end effector during a through thickness reinforcement process, in accordance with various embodiments;

FIG. 12A, FIG. 12B, FIG. 12C, and FIG. 12D illustrate needling penetration patterns comprising a triangular pattern, a square pattern, a hexagonal pattern, and a curvilinear pattern, respectively, in accordance with various embodiments; and FIG. 13A, FIG. 13B, FIG. 13C, FIG. 13D, and FIG. 13E illustrate needling penetration zones comprising a triangular pattern, a square pattern, a hexagonal-triangular (star) pattern, and a curvilinear pattern, and a hexagonal pattern, respectively, in accordance with various embodiments.

DETAILED DESCRIPTION

Figure 1A:
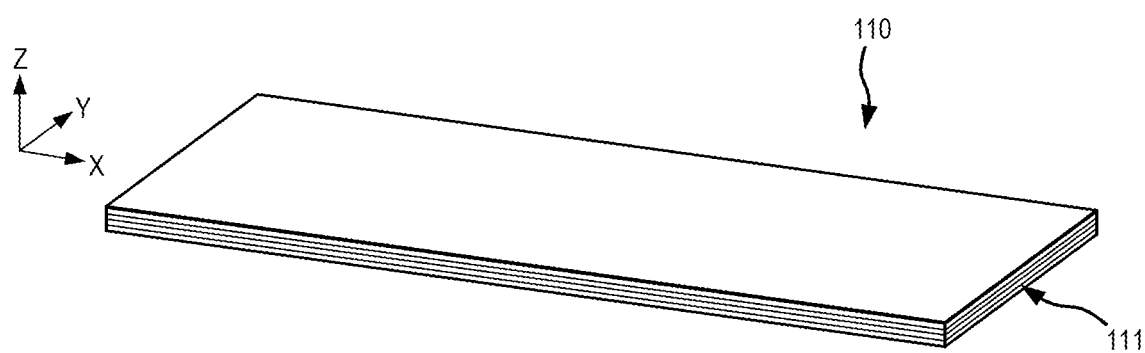
FIG. 1A illustrates a perspective view of an exemplary fibrous preform before being shape formed, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As used herein, the term "through thickness reinforcement" includes "needling," "stitching," and/or "tufting," in accordance with various embodiments.

As used herein, the term "needling" includes "stitching" and/or "tufting," in accordance with various embodiments.

As used herein, the term "fiber tow" refers to a bundle of fibers containing 1,000 to 400,000 filaments.

Carbon-Carbon composites referred to in this disclosure are a subgroup of ceramic matrix composites. Ceramic matrix composites (CMCs) are a subgroup of composite materials and a subgroup of ceramics. CMCs generally consist essentially of ceramic fibers embedded in a ceramic matrix. As used herein, the term carbon-carbon or C-C includes ceramic matrix composites and composite materials, in accordance with various embodiments. The fibers and the matrix both can consist of any ceramic material, whereby carbon and carbon fibers can also be regarded as a ceramic material, in that the carbon fibers and the carbon matrix are both capable of withstanding very high temperatures characteristic of ceramic materials. Various methods of manufacturing C-C composite materials involve fabrication of an oxidized polyacrylonitrile fiber (OPF) or carbon fiber preform (and other fibrous preforms are contemplated herein), followed by a heat-treatment step and a densification step, wherein the densification step may be performed by chemical vapor infiltration (CVI), polymer impregnation and pyrolysis (PIP), or combinations thereof. The CVI and PIP cycles are continued, in conjunction with machining the preform between CVI/PIP cycles if desired, until the desired part density is achieved. Combinations of these methods are also in use and may include variations in preform architecture, infiltration resin type, and chemical vapor infiltration conditions. Further methods may involve a combination of the two aforementioned processes including layup and cure of a carbon fiber, phenolic resin matrix composite, followed by pyrolysis, and CVI densification. Further methods may include combining one or more of the above methods by melt infiltration to achieve desired densities and properties of the composite. For example, following the CVI densification, the preform may be infiltrated by silicon metal at temperatures above the melting temperature of silicon. In various embodiments, the melt infiltration may be followed by reaction of the infiltrating material with the material in the preform. For example, in the case of silicon melt infiltration of a partially densified carbon fiber—CVI carbon matrix composite, at least a portion of the silicon may react with a portion of the carbon matrix to form silicon carbide.

After a fibrous preform is made, it is often heat-treated to create a fiber preform capable of withstanding high temperatures. In the case of OPF fiber preforms, the heat-treatment converts the OPF into carbon fibers, and the heat-treatment process may be alternatively referred to as carbonization. Typically, fibrous preforms are heat-treated by placing the preforms in a furnace with an inert atmosphere. As is well-understood, the heat of the furnace helps to drives off volatile chemical species from the preform. The resulting preform generally has the same fibrous structure as the fibrous preform before heat-treatment. In the case of OPF, the heat-treatment converts it to 100%, or nearly 100%, carbon. After the preform has been heat-treated, the preform is densified. In general, densification involves filling the voids, or pores, of the fibrous preform with additional carbon material. This may be done using the same furnace used for carbonization or a different furnace. Typically, chemical vapor infiltration and deposition ("CVI/CVD") techniques are used to densify the porous fibrous preform with a carbon matrix. This commonly involves heating the furnace and the carbonized preforms, and flowing hydrocarbon gases into the furnace and around and through the fibrous preforms. As a result, carbon from the hydrocarbon gases separates from the gases and is deposited on and within the fibrous preforms. When the densification step is completed, the resulting C/C part has a carbon fiber structure with a carbon matrix infiltrating the fiber structure, thereby deriving the name "carbon/carbon".

Prior to carbonization and/or densification, the fibrous preform may be shape formed into a net shape, or near net shape, of the final composite part. Before, during, or immediately after (i.e., before any subsequent processing such as consolidation, densification, and/or densification) being shape formed, the fibrous preform may undergo a through thickness reinforcement process (e.g., Z-needling, tufting, and/or stitching).

With reference to FIG. 1A, a perspective view of a fibrous preform 110 is illustrated. In the illustrated embodiment, fibrous preform 110 is planar or flat. In this regard, FIG. 1A illustrates fibrous preform 110 before it is shape formed. Fibrous preform 110 comprises a plurality of layers 111. Each layer 111 of material may share a common (e.g., the same) construction and/or material makeup. Each layer 111 of material, for example, may be formed by a sheet/layer of fibrous material; e.g., woven carbon fiber, woven oxidized polyacrylonitrile (PAN) fibers, non-crimp fabric, etc. One or more or all of the layers 111 of material may each be impregnated with a polymer matrix; e.g., thermoset material or thermoplastic material. One or more or all the layers 111 of material may alternatively each be unimpregnated (e.g., only include the fibrous material) where, for example, the preform material may be impregnated subsequent to formation of the preform shape. The method of the present disclosure, however, is not limited to such exemplary layer materials.

The present disclosure provides systems and methods to selectively needle regions of a fibrous preform (also referred to as a preform board) for shape-forming applications. In various embodiments, a flat fibrous preform 110 is selectively needled, such that the ease of formability of the fibrous preform 110 is increased. The selective needling to the flat fibrous preform 110 can aid in the forming of the flat fibrous preform 110 into a complex contour part (e.g., bent about one or more axes). Fibrous preform 110 can be selectively needled where interlaminar strength is desired, but left un-needled where the fibers tend to slide during the shape forming process. This can be effective in mitigating fiber nonuniformities that are generated during the forming, carbonization/heat treatment (where the fibers may slightly shrink), or in densification (where the part geometry becomes rigidized).

Figure 2A:
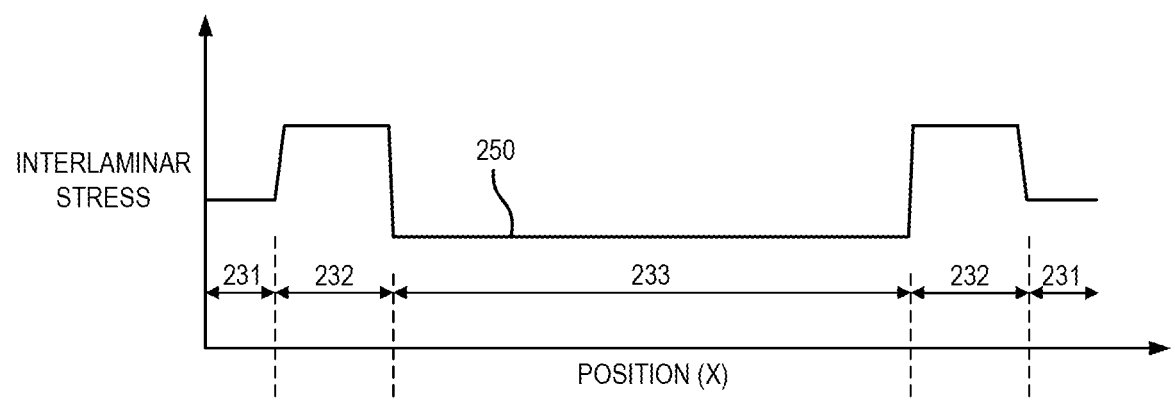
FIG. 2A and FIG. 2B illustrate charts of exemplary interlaminar stress verses position along a fibrous preform, in accordance with various embodiments.
Figure 3A:
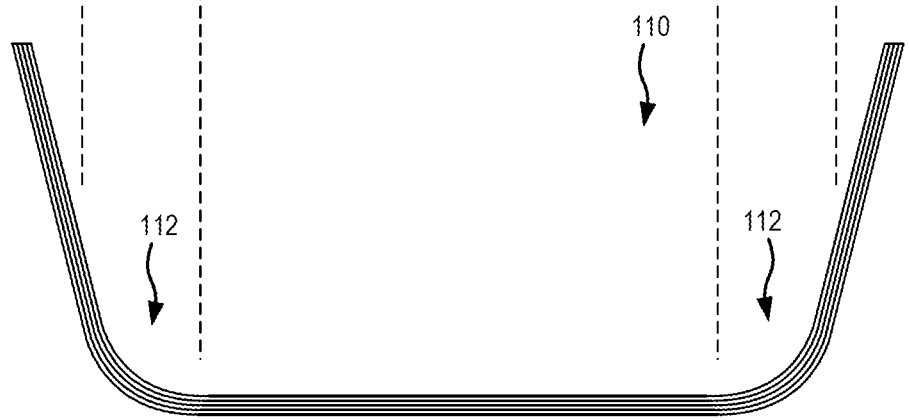
FIG. 3A, FIG. 3B, FIG. 3C, and FIG. 3D illustrate an exemplary shape formed fibrous preform corresponding to the chart of FIG. 2A, FIG. 2B, FIG. 2C, and FIG. 2D, respectively, in accordance with various embodiments.

With combined reference to FIG. 2A and FIG. 3A, a chart of an interlaminar stress curve 250 versus position of a shaped formed fibrous preform 110 is illustrated, in accordance with various embodiments. The interlaminar stress 250 may be an expected interlaminar stress of the final composite part made using the fibrous preform 110 during use. A method of selectively needling fibrous preform 110 may include identifying regions of high interlaminar stress (e.g., by testing composite parts and/or using computer models). For example, in the illustrated embodiment, high interlaminar stresses may be expected at the bent portions 112 of fibrous preform 110. It should be understood, however, that high interlaminar stresses may be expected at other portions of the fibrous preform 110. In various embodiments, a through thickness reinforcement process (i.e., Z needling) may be performed, wherein the needling density is varied based on the magnitude of the interlaminar stress 250. Stated differently, needling density may correspond to expected interlaminar stress 250. In various embodiments, the needling angle is varied to correspond to expected interlaminar stress 250. In various embodiments, the needling angle may also be varied to correspond to the subsequent forming process. Stated differently, the needling angle and density is varied such that the direction of the through thickness reinforcement aids in the subsequent shaping process and minimizes wrinkling and kinking of the fabric layers and prevents breakage of the fibers during shaping.

Figure 2B:
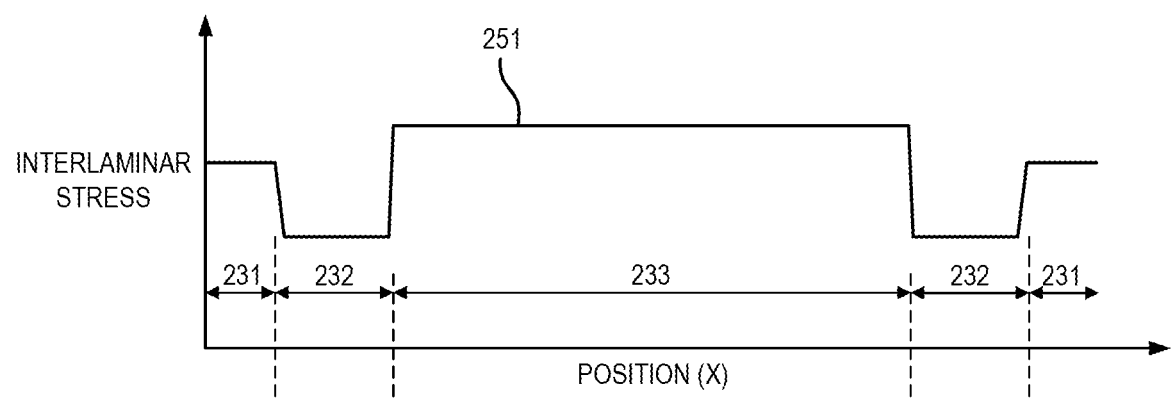
Figure 3B:
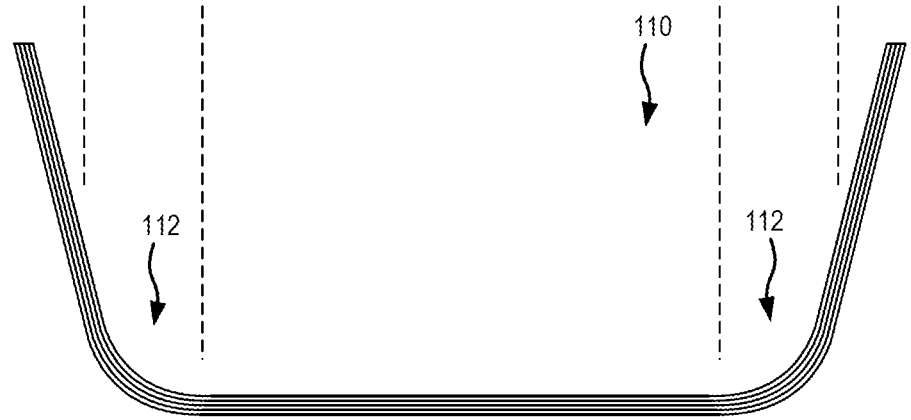

Although illustrated in FIG. 2A and FIG. 3A as exhibiting high interlaminar stresses at the bent portions of the fibrous preform 110, interlaminar stresses may be elevated at various portions of a fibrous preform, depending on various factors, such as how the part is used and/or from what direction the part reacts loads for example. For example, with combined reference to FIG. 2B and FIG. 3B, a chart of an interlaminar stress curve 251 versus position of shaped formed fibrous preform 110 is illustrated, in accordance with various embodiments. With respect to FIG. 2B and FIG. 3B, elements with like element numbering, as depicted in FIG. 2A and FIG. 3A, are intended to be the same and will not necessarily be repeated for the sake of clarity. In FIG. 2B, the interlaminar stresses 250 are reduced near the bent portions of the fibrous preform 110. For example, it may be desirable to reduce needling around the bent portions 112 of the fibrous preform 110 to allow for flexibility in the fibers around the corners during heat treatment and/or densification. Moreover, areas of fibrous preform 110 may be selected for reduced needling (or no needling) so that the continuous fibers may carry higher in-plane loads. In this example, fiber tows adjacent to the un-needled fiber tows can be needled to provide some interlaminar strength even though the majority of the fibers are left as continuous. It should be understood that FIG. 2A and FIG. 2B are intended to be non-limiting examples of measured and/or predicted interlaminar stress and in various embodiments the interlaminar stresses can be determined to be elevated at any location of the fibrous preform 110 depending on a variety of factors.

Figure 4A:
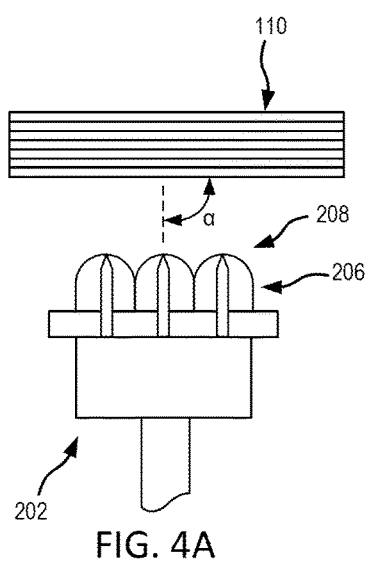
FIG. 4A, FIG. 4B, and FIG. 4C illustrates schematic sectional views of the end effector during a through thickness reinforcement process with the end effector nominally normal to a flat portion of the fibrous preform, in accordance with various embodiments.
Figure 4B:
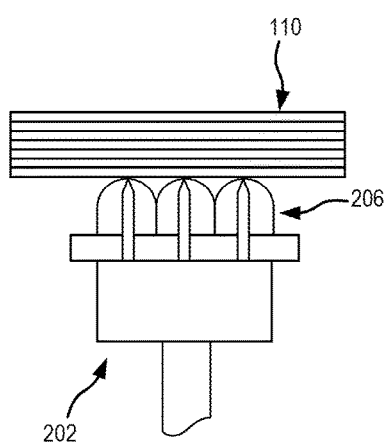
Figure 4C:
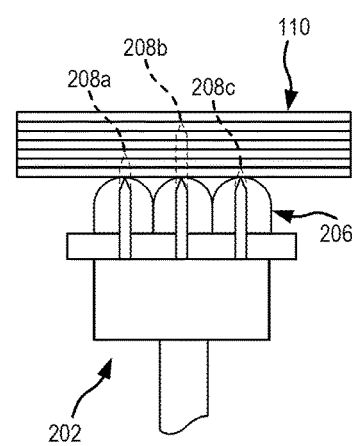

With reference to FIG. 4A, FIG. 4B, and FIG. 4C, an end effector 202 is illustrated during a through thickness reinforcement process of fibrous preform 110, in accordance with various embodiments. End effector 202 may be similar to end effector 102 (see FIG. 1) in various embodiments. FIG. 4A illustrates end effector 202 moved with respect to fibrous preform 110. For example, end effector 202 may be oriented at a desired angle α with respect to fibrous preform 110. End effector 202 may be moved toward fibrous preform 110 until one or more presser feet 206 contact fibrous preform 110. For example, presser feet 206 may exert a desired pressure on fibrous preform 110 to secure fibrous preform 110 during the through thickness reinforcement process.

Each needle 208 may be actuated independently so as to independently control a penetrating depth of each needle 208. For example, a first needle 208a may actuated to penetrate a first predetermined number of layers of fibrous preform 110, such as three layers for example, a second needle 208b may actuated to penetrate a second predetermined number of layers of fibrous preform 110, such as six layers for example, and a third needle 208c may actuated to penetrate a third predetermined number of layers of fibrous preform 110, such as two layers for example. Although penetration of three, six, and two layers is provided as an example, any number of layers of fibrous preform 110 may be penetrated by needles 208 as desired depending on the desired amount of interlocking of adjacent layers. In this regard, first needle 208a may be actuated to penetrate a first number of layers of the fibrous preform and the second needle 208b may be simultaneously, or nearly simultaneously, actuated to penetrate a second number of layers of the fibrous preform 110, wherein the first number of layers is different from the second number of layers. Stated differently, first needle 208a may penetrate the fibrous preform 110 at a first depth and second needle 208b may penetrate the fibrous preform 110 at a second depth, different from the first depth. For example, one or more layers may be omitted from the through thickness reinforcement process to allow for said layer(s) to move with respect to one another during the forming process to avoid wrinkling. In various embodiments, one or more layers may be omitted from the through thickness reinforcement process depending on the desired interlaminar preform mechanical properties, through thickness thermal conductivity, and/or other fiber dominated properties. Moreover, by independently controlling each needle, the frequency of needling may be varied as desired. Stated differently, needles 208 may be actuated independently to control a needling density to the fibrous preform 110. Moreover, while varying a needling density to correspond to the expected interlaminar stress is described herein, it should be understood that the needling depth can also be varied based upon a magnitude of the expected interlaminar stress in fibrous preform 110. Having discussed the independent control of the needles 208, the presser feet 206 may be similarly independently controlled.

The through thickness reinforcement process can comprise Z-needling. Z-needling refers to a process comprising penetrating a composite material (e.g., fibrous preform 110) with needles and moving (e.g., by pulling or pushing) fibers from the in-plane direction and forcing them into the Z direction, where the "Z direction" as used herein refers to a direction that is not parallel to the in-plane direction and going through the fabric layers. For example, the "Z direction" may be perpendicular to the in-plane direction. In various embodiments, the "Z direction" may be an angle greater than 0 (or parallel to the in-plane direction) but less than 90 degrees (or perpendicular to the in-plane direction). For preforms having curved surfaces, the "Z direction" refers to the direction normal or at an angle to a (local) surface of the fibrous preform at the point where the preform is being needled (i.e., a direction normal or at an angle between 0 and 90 degrees to the tangent plane to the surface at the point of needling). In general, the through thickness reinforcement process has the effect of interlocking individual fabric layers together. Thus, after through thickness reinforcement, the fibrous material has fibers extending in three different directions (i.e., in the X and Y directions in the plane of the fibrous layers and the Z direction perpendicular to or at an angle through the thickness of the fibrous layers). It should be appreciated that due to the complex contours of the fibrous preform 110, the X, Y, and Z directions vary depending on the particular location of the fibrous preform 110. Through thickness reinforcement may increase local interlaminar strength due to the effect of interlocking individual fabric layers together.

Figure 5:
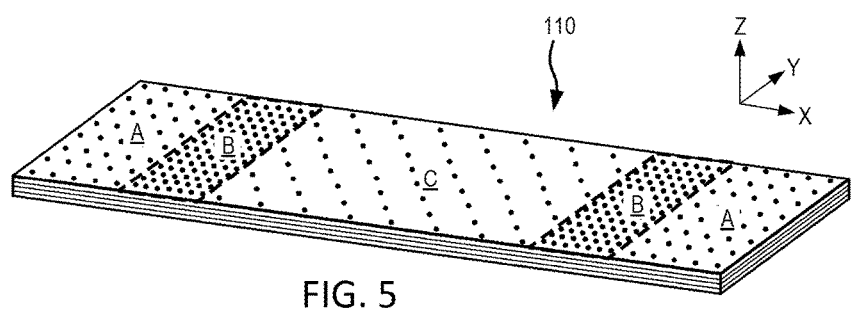
FIG. 5 illustrates a perspective view of a fibrous preform with zones of the fibrous preform needled at different densities based on the interlaminar stress curve of FIG. 2, in accordance with various embodiments.

With combined reference to FIG. 2A and FIG. 5, a first zone A can be identified on fibrous preform 110 corresponding to interlaminar stress 231. Interlaminar stress 231 can be a single value or a range of values (e.g., an interlaminar stress envelope). Interlaminar stress 231 can be an average interlaminar stress. First zone A can extend longitudinally (i.e., along the X-direction) and laterally (i.e., along the Y-direction) along fibrous preform 110. A second zone B can be identified on fibrous preform 110 corresponding to interlaminar stress 232. Interlaminar stress 232 can be a single value or a range of values (e.g., an interlaminar stress envelope). Interlaminar stress 232 can be an average interlaminar stress. Second zone B can extend longitudinally (i.e., along the X-direction) and laterally (i.e., along the Y-direction) along fibrous preform 110. A third zone C can be identified on fibrous preform 110 corresponding to interlaminar stress 233. Interlaminar stress 233 can be a single value or a range of values (e.g., an interlaminar stress envelope). Interlaminar stress 233 can be an average interlaminar stress. Third zone C can extend longitudinally (i.e., along the X-direction) and laterally (i.e., along the Y-direction) along fibrous preform 110.

During the through thickness reinforcement process, fibrous preform 110 may be needled at a first needle density in zone A, a second needle density in zone B, and a third needle density in zone C. In various embodiments, the second needle density is greater than the second needle density in order to increase the interlaminar strength of fibrous preform 110 so as to handle the increased interlaminar stress 232. In various embodiments, the first needle density is greater than the third needle density in order to increase the interlaminar strength of fibrous preform 110 so as to handle the interlaminar stress 231 which is greater than interlaminar stress 233. Moreover, although illustrated as being needled at zones A, B, and C, one or more zones A, B, or C may be left un-needled where the fibers tend to slide during the shape forming process. The rate of change of needling density along the length (X-direction) or width (Y-direction) of fibrous preform 110 can be varied as desired, depending on the desired interlaminar strength characteristics.

Figure 2C:
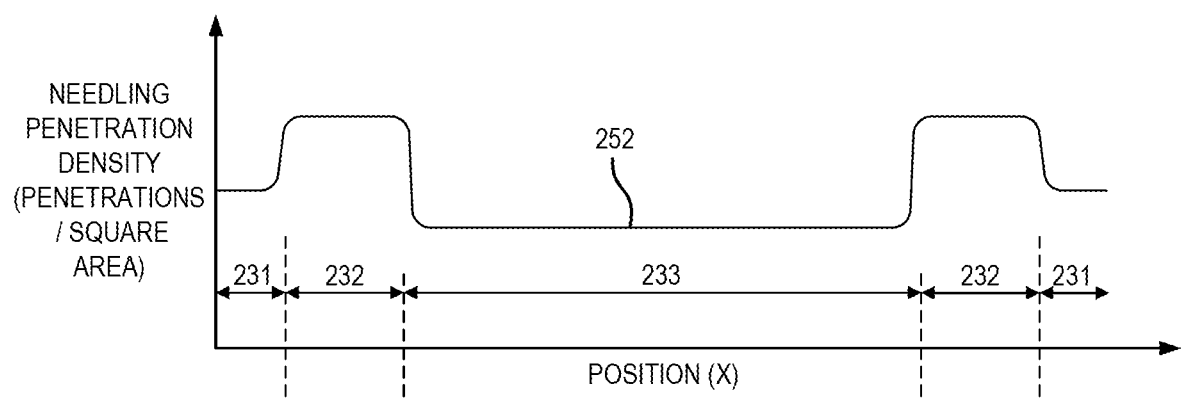
FIG. 2C and FIG. 2D illustrate charts of exemplary needling penetration and needling angle, respectively, verses position along a fibrous preform, in accordance with various embodiments.
Figure 3C:
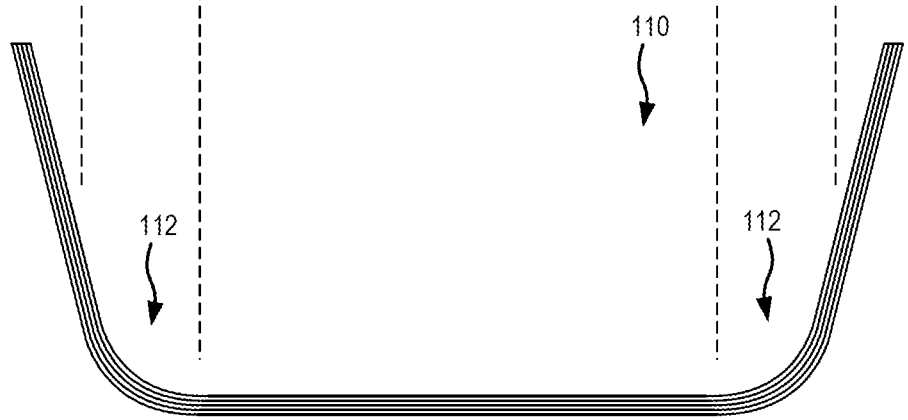

With reference to FIG. 2C and FIG. 3C, an exemplary needling density curve 252 (e.g., penetrations/square area) is illustrated. Needling density curve 252 may be selected to correspond to the magnitude of the interlaminar stress curve 250 (see FIG. 2A). In this regard, needling density 252 may increase with interlaminar stress 250, in accordance with various embodiments.

Having described varying a needling density to correspond to the expected interlaminar stress, the needling angle α can similarly be varied to correspond to the expected interlaminar stress. In this regard, it should be understood that the needling density, the needling angle, or both can be varied based upon a magnitude of the expected interlaminar stress in fibrous preform 110.

Figure 2D:
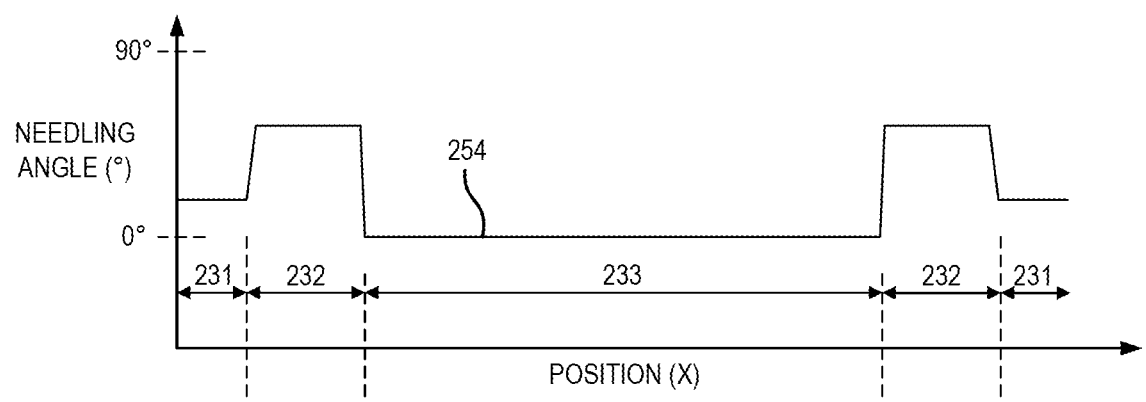
Figure 3D:
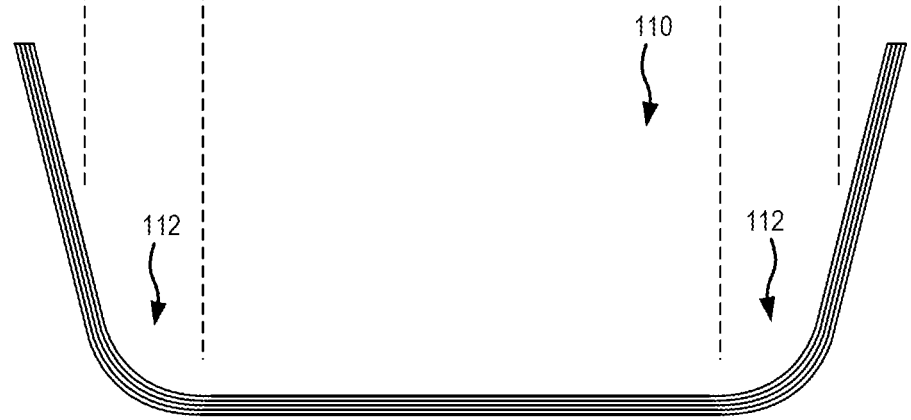

With reference to FIG. 2D and FIG. 3D, an exemplary needling angle curve 254 is illustrated. Needling angle curve 254 may be selected to correspond to the magnitude of the interlaminar stress curve 250 (see FIG. 2A). In this regard, needling angle 254 may increase with interlaminar stress 250, in accordance with various embodiments. The needling angle refers to the angle of the needle body with respect to the preform normal axis.

Figure 6A:
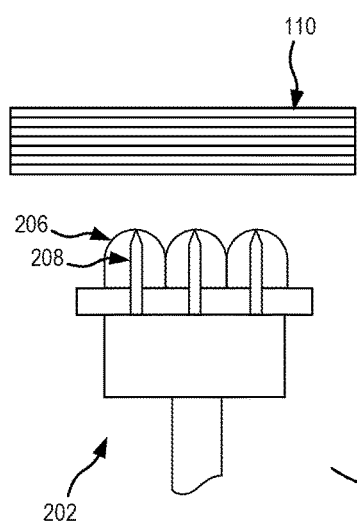
FIG. 6A, FIG. 6B, and FIG. 6C illustrate schematic sectional view of the end effector during a through thickness reinforcement process with the end effector at an angle with respect to a flat portion of the fibrous preform, in accordance with various embodiments.
Figure 6B:
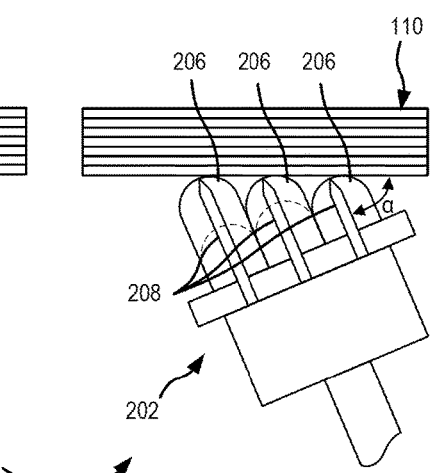
Figure 6C:
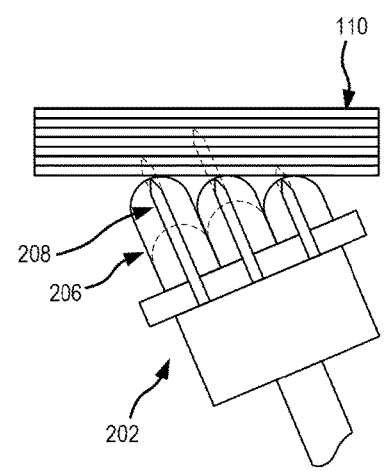

With reference to FIG. 6A, FIG. 6B, and FIG. 6C, end effector 202 is illustrated during a through thickness reinforcement process of fibrous preform 110, in accordance with various embodiments. FIG. 6A illustrates end effector 202 moved with respect to fibrous preform 110. FIG. 6B illustrates end effector 202 oriented at a desired angle α with respect to fibrous preform 110. In various embodiments, angle α is an angle of the centerline of a needle 208 with respect to the fibrous preform. Angle α may be between twenty degrees and ninety degrees in accordance with various embodiments, between thirty degrees and eighty degrees in accordance with various embodiments, or between twenty five degrees and eighty degrees in accordance with various embodiments. End effector 202 may be moved toward fibrous preform 110 until one or more presser feet 206 contact fibrous preform 110. For example, presser feet 206 may exert a desired pressure on fibrous preform 110 to secure fibrous preform 110 during the through thickness reinforcement process. FIG. 6C illustrates end effector 202 oriented at the desired angle α with respect to fibrous preform 110 with the needles 208 penetrating the fibrous preform 110 to provide through thickness reinforcement.

The end effector 202 tends to enable flat surfaces to be needled at a variety of angles dependent on targeted properties and forming characteristics in specific fibrous preform 110 regions. The angle α may vary dependent on the fibrous preform 110 region, fabric layer, or needled penetration density. Resultant through thickness reinforcement fibers may be parallel to the through-thickness axis or at an angle to mitigate fiber wrinkling/kinking. Moreover, by selectively needling different regions/layers of the fibrous preform 110 (either with different needle penetration densities or angles), the fibrous preform 110 may be able to be shaped into complex contour shapes more efficiently and with less damage. Still further, angled selective needling can be performed so as to form curvature in a fibrous preform 110 by pulling angled through thickness reinforcement fibers through the laminate. By needling angled linear or non-linear through thickness reinforcement fibers through a laminate, the laminate will be influenced to form a curve, further aiding in the shape-forming process.

Having described a needling process to fibrous preform 110 while the fibrous preform is flat before shape forming, it is further contemplated that fibrous preform 110 may be needled during or after the shape forming process.

Figure 1B:
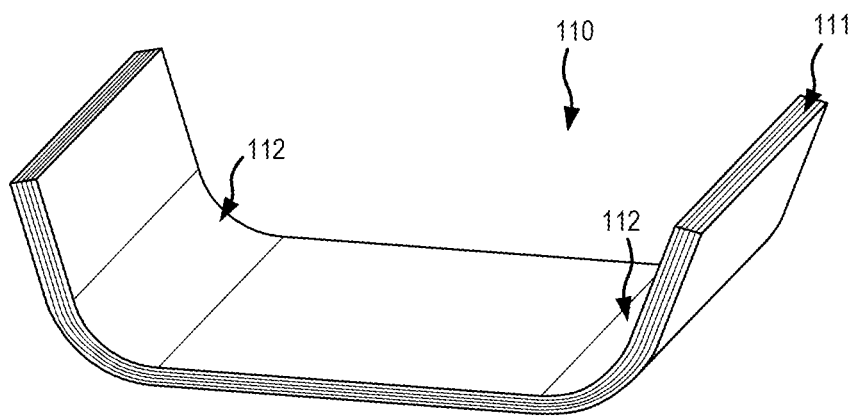
FIG. 1B illustrates a perspective view of an exemplary fibrous preform during or after being shape formed, in accordance with various embodiments.

With reference to FIG. 1B, fibrous preform 110 is illustrated during or after a shape forming process. After being shape formed, fibrous preform 110 may be bent along one or more axes. In this illustrated embodiment, fibrous preform 110 comprises bent portions 112, though in various embodiments fibrous preform 110 may comprise any complex contour shape depending on the desired geometry of the final part. As described with respect to FIG. 2A and FIG. 3A, zones of high interlaminar stress may be located and/or identified on fibrous preform 110 (e.g., see zones A, B, and C of FIG. 5). Needling density and/or needling angle may be determined for each of these identified zones, as described herein.

Figure 7A:
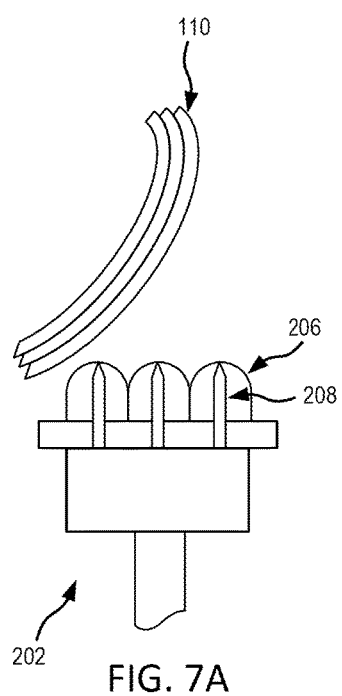
FIG. 7A, FIG. 7B, and FIG. 7C illustrate schematic sectional views of the end effector during a through thickness reinforcement process to a rounded portion of the fibrous preform, in accordance with various embodiments.
Figure 7B:
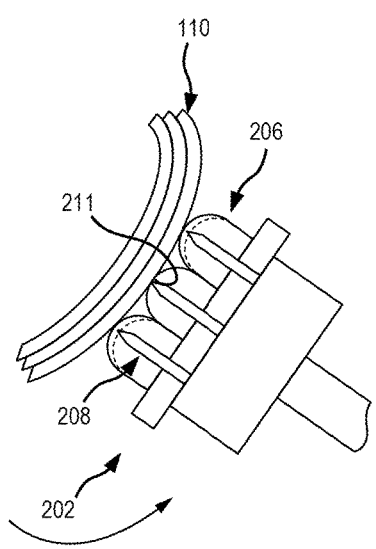
Figure 7C:
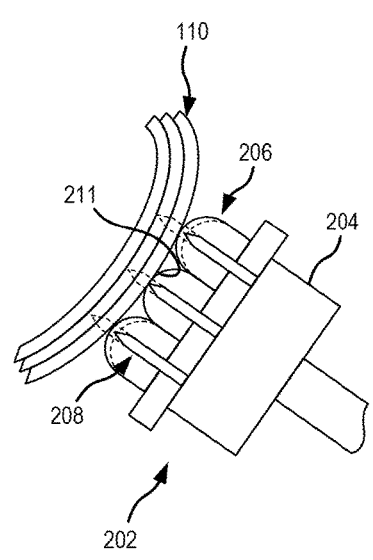

With reference to FIG. 7A, FIG. 7B, and FIG. 7C, end effector 202 may be particularly useful for portions of fibrous preform 110 which are rounded or have complex contours due to the ability of the presser feet 206 to conform to a curved surface of the fibrous preform 110. In the illustrated embodiment, and with particular focus on FIG. 7B, end effector 202 may be oriented nominally normal to the surface 211 of the fibrous preform 110; though in various embodiments end effector 202 is oriented at an angle to the surface 211 of the fibrous preform 110, as described herein. In various embodiments, a centrally located presser foot 206b may first contact the surface 211 and the surrounding presser feet 206 a and 206c may be actuated to extend to contact the surface 211 to provide uniform pressure on the fibrous preform during the through thickness reinforcement process (see FIG. 7C); though in various embodiments a non-centrally located presser foot may first contact the fibrous preform 110 and centrally located presser feet may be actuated to contact the fibrous preform 110.

With particular focus on FIG. 7C, needles 208 and/or presser feet 206 may be configured to articulate (e.g., pivot) to maintain needles 208 and/or presser feet 206 nominally perpendicular to the surface 211 of the fibrous preform 110. For example, needles 208 and/or presser feet 206 may be mounted to a pivot, such as a ball joint or the like, to accommodate rotation of the needles 208 and/or presser feet 206 with respect to body 204 of end effector 202.

In this regard, fibrous preform 110 may undergo the through thickness reinforcement after being shape formed. For example bent portions 112 (see FIG. 3) may be needled after the fibrous preform 110 is shape formed.

With reference to FIG. 8, an exemplary robotic arm 100 comprising an end effector 102 is illustrated during a through thickness reinforcement process of fibrous preform 110, in accordance with various embodiments. Fibrous preform 110 may be placed over a tool 115 and formed to the geometry of the tool 115. In this manner, fibrous preform 110 may be shaped into a complex contour preform (e.g., bent about one or more axes). Robotic arm 100 may be configured to move the end effector 102 with respect to the fibrous preform 110 in a controlled manner to perform the through thickness reinforcement process.

With reference to FIG. 9, a view of the face of end effector 102 is illustrated, in accordance with various embodiments. End effector 102 may comprise a head or body 104, a plurality of presser feet 106 (e.g., first presser foot 106a, second presser foot 106b, etc.), and a plurality of needles 108 (e.g., first needle 108a, second needle 108b, etc.). Body 104 may be made from a metal material, a composite material, or a plastic material. Body 104 may house various components for actuating presser feet 106 and/or needles 108. Presser feet 106 may be moveable with respect to body 104. Presser feet 106 may be moveable with respect to needles 108. Needles 108 may be moveable with respect to body 104. Needles 108 may be moveable with respect to presser feet 106. A face 105 of the body may be flat or planar. Face 105 may face the fibrous preform during the through thickness reinforcement process. In various embodiments, presser feet 106 and needles 108 extend from face 105.

In various embodiments, each presser foot 106 comprises a cylindrical body with a hemispherical-shaped end; though other presser foot 106 shapes and/or designs are contemplated herein. Each presser foot 106 may be made from a metal material, a rubber material, or a plastic material. The material of presser foot 106 may be selected based on the desired pressure exerted onto fibrous preform 110, among other factors.

In various embodiments, each needle 108 may be made from a metal material or a polymer material or a ceramic material or combinations thereof. For example, the needle may be a metal material with a polymer coating or it may be a metal material with a ceramic coating. The material and coating system of needle 108 may be selected depending on the material of fibrous preform 110, among other factors.

With reference to FIG. 10, end effector 102 is illustrated during a through thickness reinforcement process of fibrous preform 110. Fibrous preform 110 may comprise a first layer 114 and a second layer 116. First layer 114 may be a top layer. End effector 102 may be moved (e.g., via robotic arm 100) with respect to fibrous preform 110. With the end effector 102 in the desired position, one or more needles may be actuated to penetrate fibrous preform 110, thereby moving one or more fibers 113 (also referred to herein as through thickness reinforcement fibers) from first layer 114 into second layer 116 and interlocking first layer 114 with second layer 116. For example, needle 108a is illustrated in FIG. 10 moving from a non-penetrating position to a penetrating position (also referred to herein as a retracted position (see needle 108b) and an extended position (see needle 108a), respectively). In this regard, needles 108 may be referred to herein as articulating needles. Needle 108b may be similarly operated. Needles 108a and 108b can be controlled individually or in groups by programmable robotic system to puncture the plies of fibrous preform 110 to a desired depth and/or a desired needling density (e.g., various needles 108 may be commanded not to penetrate the fibrous preform to vary a needling density (i.e., number of needles per unit area)). The needles 108a and 108b may be configured to puncture the fibers in the top ply or a sacrificial ply layer into the adjacent plies at the desired angle and depth. The end effector 102 may be rotated to appropriate angles to needle plies at different desired angles (e.g., see FIG. 6B).

FIG. 10 illustrates presser foot 106a in a retracted position and presser foot 106b in an extended position, whereby the presser feet 106. In this regard, presser feet 106 may be referred to herein as articulating presser feet.

Figure 11A:
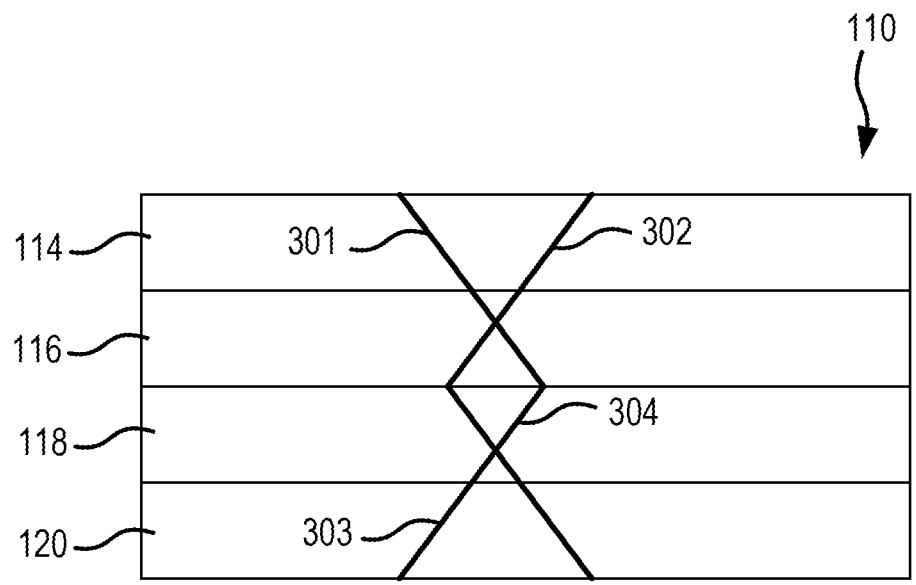
FIG. 11A and FIG. 11B illustrate angled through thickness reinforcement fibers extending between various plies or layers of a fibrous preform in various patterns, in accordance with various embodiments.

With reference to FIG. 11A, through thickness reinforcement (TTR) fibers (e.g., TTR fiber 301, TTR fiber 302, TTR fiber 303, and TTR fiber 304) are illustrated extending through various plies or layers (e.g., first layer 114, second layer 116, third layer 118, and/or fourth layer 120) of fibrous preform 110. The TTR fibers can be oriented using a through thickness reinforcement process as described herein. In various embodiments, TTR fiber 301 extends at an angle from and between first layer 114 and second layer 116. TTR fiber 302 can similarly extend at an angle from and between first layer 114 and second layer 116. TTR fiber 302 can overlap (when viewing the fibrous preform 110 in the in-plane direction, for example as shown in FIG. 11A) TTR fiber 301. TTR fiber 303 can extend at an angle from and between third layer 118 and fourth layer 120. TTR fiber 304 can similarly extend at an angle from and between third layer 118 and fourth layer 120. TTR fiber 304 can overlap (when viewing the fibrous preform 110 in the in-plane direction, for example as shown in FIG. 11A) TTR fiber 303. In this manner, third and fourth layers 118, 120 can be needled at two different angles at a first time to generate TTR fibers 303, 304. Then, first and second layers 114, 116 can be added to third and fourth layers 118, 120 and can similarly be needled at two different angles at a second time to generate TTR fibers 301, 302.

Figure 11B:
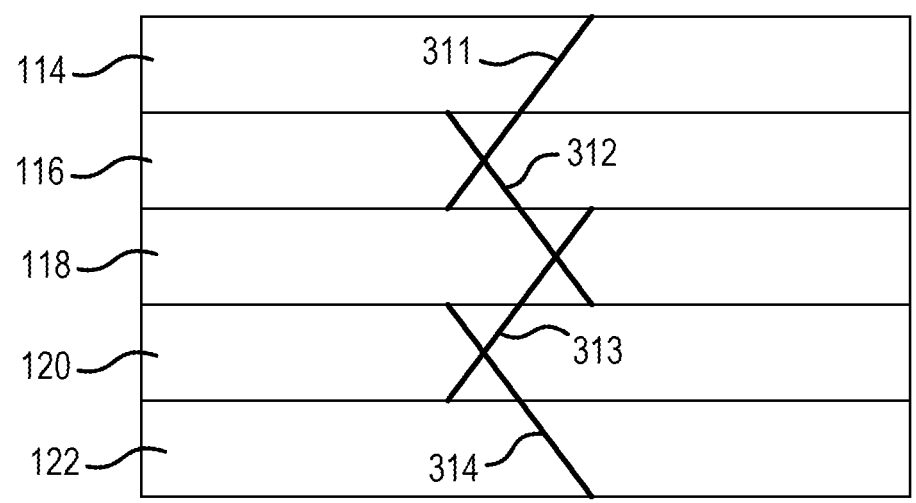

With reference to FIG. 11B, TTR fibers (e.g., TTR fiber 311, TTR fiber 312, TTR fiber 313, and TTR fiber 314) are illustrated extending through various plies or layers (e.g., first layer 114, second layer 116, third layer 118, fourth layer 120 and/or fifth layer 122) of fibrous preform 110. The TTR fibers can be oriented using a through thickness reinforcement process as described herein. In various embodiments, TTR fiber 311 extends at an angle from and between first layer 114 and second layer 116. TTR fiber 312 can extend at an angle from and between second layer 116 and third layer 118. TTR fiber 302 can overlap TTR fiber 301 (when viewing the fibrous preform 110 in the in-plane direction, for example as shown in FIG. 11B). TTR fiber 313 can extend at an angle from and between third layer 118 and fourth layer 120. TTR fiber 314 can extend at an angle from and between fourth layer 120 and fifth layer 121. TTR fiber 314 can overlap TTR fiber 313 (when viewing the fibrous preform 110 in the in-plane direction, for example as shown in FIG. 11A). In this manner, fourth and fifth layers 120, 122 can be needled at a first angle at a first time to generate TTR fiber 314. Then, third layer 118 can be added to fourth and fifth layers 120, 122 and can be needled at a second angle at a second time to generate TTR fiber 313. Second layer 116 can subsequently be added over third layer 118 and can be needled at an angle (e.g., the first angle or another angle) at a third time to generate TTR fiber 312. First layer 114 can subsequently be added over second layer 116 and can be needled at an angle (e.g., the second angle or another angle) at a fourth time to generate TTR fiber 312.

Figure 11C:
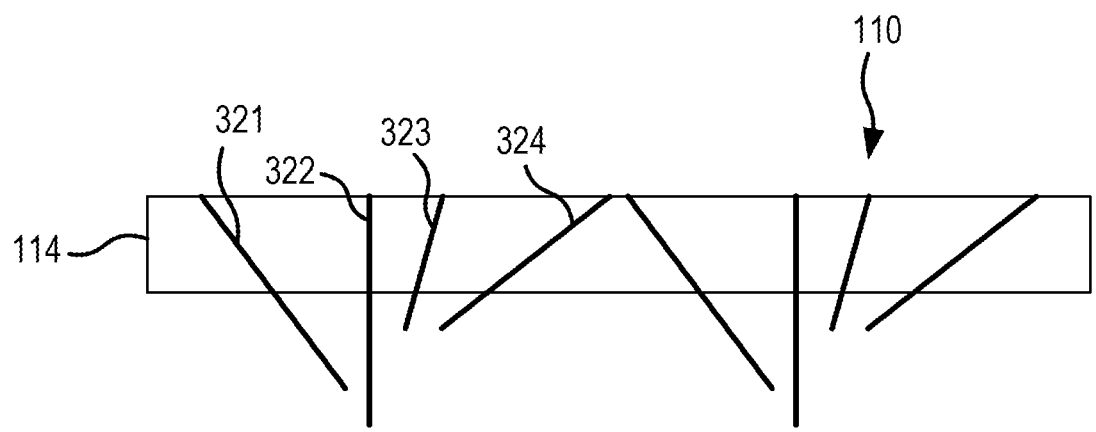
FIG. 11C illustrates an array of through thickness reinforcement fibers with the angle of each through thickness reinforcement fiber different from an adjacent through thickness reinforcement fiber, in accordance with various embodiments.

With reference to FIG. 11C, TTR fibers (e.g., TTR fiber 321, TTR fiber 322, TTR fiber 323, and TTR fiber 324) are illustrated extending through a ply or layer 114 of fibrous preform 110. Although illustrated in connection with layer 114, the TTR fibers can be located at a ply other than layer 114. Selective needling may be applied to create an array of straight and angled TTR fibers (e.g., instead of larger regions separated by selective needling characteristics) in order to achieve a more optimized balance of formability and strength. For example, TTR fiber 321 may be oriented at a first angle. The adjacent TTR fiber 322 may be normal to the fibrous preform 110 (e.g., an angle of zero, or not angled, and optionally at a different depth than the TTR fiber 321 and/or TTR fiber 322. The next TTR fiber 323 may be oriented at a second angle and optionally at a different depth than the TTR fiber 321 and/or TTR fiber 322. The next adjacent fiber 324 may be oriented at yet another angle (e.g., a third angle). In various embodiments, each TTR fiber 321, 322, 323, 324 may be oriented at a different angle from at least one immediately adjacent (i.e., without another TTR fiber disposed along a straight line therebetween) TTR fiber. In this regard, the needle angle (and thus the resulting TTR fiber angle) may change every needle penetration dependent upon desired forming characteristics.

Figure 11D:
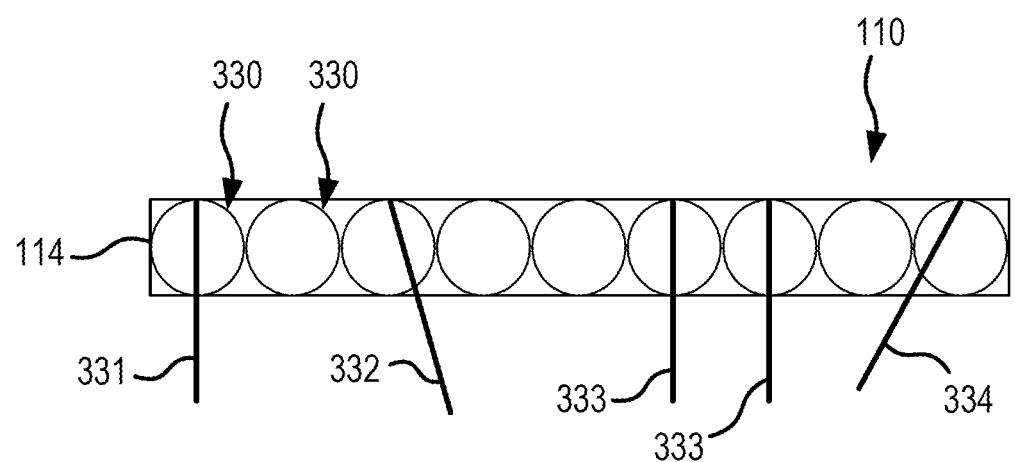
FIG. 11D illustrates through thickness reinforcement fibers creating an array of both needled and unneedled zones within the preform, in accordance with various embodiments.

With reference to FIG. 11D, TTR fibers (e.g., TTR fiber 331, TTR fiber 332, TTR fibers 333, and TTR fiber 334) are illustrated extending through a ply or layer 114 of fibrous preform 110. Although illustrated in connection with layer 114, the TTR fibers can be located at a ply other than layer 114. Selective needling can be applied to create an array of needled and unneedled fabric fibers 330 (e.g., instead of larger regions separated by selective needling characteristics). This may enable regions to contain both continuous fibers and through-thickness reinforcement, where ease of forming and high strength are both required. For example, in FIG. 11D, some fabric fibers 330 are left unneedled to serve as higher load-bearing continuous fibers. In this regard, a first fiber 330 may be needled, a second fiber 330 may be unneedled, and a third fiber 330 may be left unneedled so as to maintain the third fiber as a continuous (e.g., unbroken) fiber. As illustrated, fibers 330 represent fiber tows, however, in various embodiments, fibers 330 may represent individual fibers.

With reference to FIG. 12A through FIG. 12D, needling penetration patterns may be selected from various shapes at various locations of the fibrous preform depending on the desired through thickness reinforcement and the expected interlaminar stress. FIG. 12A through FIG. 12D illustrate fibrous preforms 110 with circles 340 representing a single needle punch. Needling penetrations patterns (i.e., the arrangement of needle punches 340) can comprise a triangular pattern (see FIG. 12A), a square pattern (see FIG. 12B), a hexagonal pattern (see FIG. 12C), and/or a curvilinear pattern (see FIG. 12D).

In various embodiments, penetration density (needle punches per unit area) and transport depth (depth of needle penetration) may be varied in accordance with various embodiments. Varying penetration density and transport depth can also aid in achieving tailored/targeted properties in different areas of the preform. In various embodiments, overall penetration density may be between 10 and 200 penetrations/cm$^2$. In various embodiments, penetration pattern may be various geometries (i.e. triangular, rectangular, hexagonal, diamond, etc). FIG. 12A through FIG. 12D illustrates various exemplary penetration patterns in accordance with various embodiments of the present disclosure. In various embodiments, the penetration spacing along the length of the preform or fiber tow may be 0.5 mm to 2.5 mm. In various embodiments, the needled and unneedled fiber tows may be spaced 0.5 mm to 2.5 mm apart. In various embodiments, transport depth may be 5 mm to 20 mm, for example. In various embodiments, transport depth may be measured in terms of penetrated plies, for example from 1 ply to 20 plies.

With reference to FIG. 13A through FIG. 13E, needling penetration zones may be selected from various shapes at various locations of the fibrous preform depending on the desired through thickness reinforcement and the expected interlaminar stress. FIG. 13A through FIG. 13E illustrate fibrous preforms 110 with black areas 342 representing a non-needled zone and white areas 344 representing a needled zone. In this regard, a first needled zone may be spaced apart from a second needled zone, wherein a non-needled zone is disposed therebetween. Needling penetrations zones (i.e., the areas where the fibrous preform 110 is needled) can comprise a plurality of triangular patterns (see FIG. 13A), a plurality of square patterns (see FIG. 13B), a plurality of hexagonal-triangular patterns (see FIG. 13C), a plurality of curvilinear pattern (see FIG. 13D), and/or a matrix of hexagonal pattern (see FIG. 13E).

Systems and methods of the present disclosure include a tool for producing composite preforms with tailored in-plane and interlaminar properties. Systems and methods of the present disclosure enable the ability to needle on a complex contour preform. Systems and methods of the present disclosure allow for precisely controlling and programing needling location, angle, depth, and areal density. Systems and methods of the present disclosure allow spatially varying the needling parameters to vary interlaminar versus in-plane properties based on the desired application. Systems and methods of the present disclosure enable fabrication of through thickness reinforced complex contour composite preforms for aerospace structures. Systems and methods of the present lend themselves to fully automated fabrication to reduce costs, improve reproducibility, and scale to production rates.

Systems and methods of the present disclosure can increase formability in creating complex contour fibrous preforms via shape-forming and minimizes potential to wrinkle during forming. Systems and methods of the present disclosure (i.e., selective needling) can enable fiber-reinforced composite (e.g., CMC such as carbon/carbon) components to achieve greater mechanical properties. Systems and methods of the present disclosure can enable utilization of this material system in more extreme applications. Systems and methods of the present disclosure tend to reduce undesired non-uniformities introduced via fiber kinking in further processing, such as shape forming, carbonization, heat treatment, and densification. In this regard, systems and methods of the present disclosure are performed on fibrous preforms before consolidation, carbonization, heat treatment, and/or densification.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method for selective needling on a fibrous preform, comprising:
    shape forming the fibrous preform, including bending the fibrous preform about at least one axis to form a bent portion of the fibrous preform;
    identifying a first zone on the fibrous preform, the first zone includes the bent portion of the fibrous preform;
    identifying a second zone on the fibrous preform, the second zone excludes the bent portion of the fibrous preform;
    performing a through thickness reinforcement process on the fibrous preform; and
    varying a needle density during the through thickness reinforcement process such that a first needle density of the first zone is different from a second needle density of the second zone.

2. The method of claim 1, wherein the first zone is identified as comprising a first expected interlaminar stress and the second zone is identified as comprising a second expected interlaminar stress, wherein the first expected interlaminar stress is different from the second expected interlaminar stress, and the first expected interlaminar stress and the second expected interlaminar stress are identified independent of the through thickness reinforcement process.

3. The method of claim 1, further comprising varying a needle penetrating depth during the through thickness reinforcement process such that a first needle penetrating depth of at least one of the first zone or the second zone is different from a second needle penetrating depth of the other of the first zone or the second zone.

4. The method of claim 1, further comprising varying a needle angle during the through thickness reinforcement process such that a first needle angle of at least one of the first zone or the second zone is different from a second needle angle of the other of the first zone or the second zone.

5. The method of claim 1, wherein the through thickness reinforcement process comprises:
    penetrating the fibrous preform with a first needle;
    penetrating the fibrous preform with a second needle;

moving at least a portion of a first fiber from a first fabric layer of the fibrous preform into a second fabric layer of the fibrous preform in response to the first needle penetrating the fibrous preform; and moving at least a portion of a second fiber from the first fabric layer of the fibrous preform into the second fabric layer of the fibrous preform in response to the second needle penetrating the fibrous preform.

6. The method of claim 1, wherein the shape forming the fibrous preform is performed subsequent to the through thickness reinforcement process.

7. The method of claim 1, wherein the shape forming the fibrous preform is performed prior to the through thickness reinforcement process.

8. The method of claim 1, further comprising at least one of:

performing a compaction of the fibrous preform prior to performing the through-thickness reinforcement process; or performing a heat-treatment process on the fibrous preform subsequent to performing the through thickness reinforcement process; or performing a densification process on the fibrous preform subsequent to performing the through thickness reinforcement process.

9. The method of claim 1, wherein the fibrous preform comprises a plurality of fabric layers, and the through thickness reinforcement process moves at least one through thickness reinforcement fiber from a first fabric layer of the fibrous preform into a second fabric layer of the fibrous preform, thereby interlocking the first fabric layer with the second fabric layer.

10. A method for selective needling on a fibrous preform, comprising:

shape forming the fibrous preform, including bending the fibrous preform about at least one axis to form a bent portion of the fibrous preform;

identifying a first zone on the fibrous preform, the first zone includes the bent portion of the fibrous preform;

identifying a second zone on the fibrous preform, the second zone excludes the bent portion of the fibrous preform;

performing a through thickness reinforcement process on the fibrous preform; and varying a needle angle during the through thickness reinforcement process such that a first needle angle of the first zone is different from a second needle angle of the second zone.

11. The method of claim 10, wherein the first zone is identified as comprising a first expected interlaminar stress and the second zone is identified as comprising a second expected interlaminar stress, wherein the first expected interlaminar stress is different from the second expected interlaminar stress, and the first expected interlaminar stress and the second expected interlaminar stress are identified independent of the through thickness reinforcement process.

12. The method of claim 11, further comprising varying a needle penetrating depth during the through thickness reinforcement process such that a first needle penetrating depth of at least one of the first zone or the second zone is different from a second needle penetrating depth of the other of the first zone or the second zone.

13. The method of claim 10, further comprising varying a needle density during the through thickness reinforcement process such that a first needle density of at least one of the first zone or the second zone is different from a second needle density of the other of the first zone or the second zone.

14. The method of claim 10, wherein the through thickness reinforcement process comprises:

penetrating the fibrous preform with a first needle;

penetrating the fibrous preform with a second needle;

moving at least a portion of a first fiber from a first fabric layer of the fibrous preform into a second fabric layer of the fibrous preform in response to the first needle penetrating the fibrous preform; and moving at least a portion of a second fiber from the first fabric layer of the fibrous preform into the second fabric layer of the fibrous preform in response to the second needle penetrating the fibrous preform.

15. The method of claim 10, wherein the through thickness reinforcement process comprises:

penetrating a first fiber;

penetrating a second fiber; and leaving a third fiber between the first fiber and the second fiber unneedled so as to maintain the third fiber as a continuous fiber.

16. The method of claim 10, wherein the through thickness reinforcement process comprises penetrating a plurality of zones to generate a plurality of needled zones, wherein the plurality of needled zones comprise at least one of a triangular, a square, a hexagonal, or a curvilinear geometry.

17. The method of claim 10, further comprising:

penetrating a first area of the fibrous preform with a first needling penetration penetrations pattern; and penetrating a second area of the fibrous preform with a second needling penetration pattern, wherein the first needling penetration pattern comprises at least one of a triangular pattern, a square pattern, a hexagonal pattern, or a curvilinear pattern, and the second needling penetration pattern comprises another of the at least one of the triangular pattern, the square pattern, the hexagonal pattern, or the curvilinear pattern.

18. The method of claim 11, wherein the needling angle is selected to correspond to a magnitude of the first expected interlaminar stress and the second expected interlaminar stress.

19. A method for selective needling on a fibrous preform, comprising:

identifying a first zone comprising a first expected interlaminar stress on the fibrous preform;

identifying a second zone comprising a second expected interlaminar stress different from the first expected interlaminar stress on the fibrous preform;

performing a through thickness reinforcement process on the fibrous preform; and varying a needle penetrating depth during the through thickness reinforcement process such that a first needle penetrating depth of the first zone is different from a second needle penetrating depth of the second zone;

wherein the first expected interlaminar stress and the second expected interlaminar stress are identified independent of the through thickness reinforcement process.

20. The method of claim 19, further comprising shape forming the fibrous preform, including bending the fibrous preform about at least one axis to form a bent portion of the fibrous preform;

the first zone includes the bent portion of the fibrous preform; and the second zone excludes the bent portion of the fibrous preform.

* * * * *

UNITED STATES PATENT AND TRADEMARK OFFICE
CERTIFICATE OF CORRECTION

Page 1 of 1

PATENT NO. : 12,421,637 B2
APPLICATION NO. : 18/174360
DATED : September 23, 2025
INVENTOR(S) : Vijay V. Pujar et al.

It is certified that error appears in the above-identified patent and that said Letters Patent is hereby corrected as shown below:

In the Claims

Column 18, Claim 17 Line 30 delete "penetrations"

Signed and Sealed this
Twenty-fifth Day of November, 2025

John A. Squires
*Director of the United States Patent and Trademark Office*